United States Patent [19]

Jurva et al.

[11] 4,174,424
[45] Nov. 13, 1979

[54] SEAL ARRANGEMENT FOR FACILITATING HERMETICITY LEAKAGE TESTING

[75] Inventors: Edsel O. Jurva, Anoka; Howard D. Mosman, Fridley, both of Minn.

[73] Assignee: Medtronic, Inc., Minneapolis, Minn.

[21] Appl. No.: 917,595

[22] Filed: Jun. 21, 1978

[51] Int. Cl.² ............................................. H01M 2/00
[52] U.S. Cl. .................................... 429/90; 429/185; 73/40.7; 220/256
[58] Field of Search ................ 429/90, 174, 185, 171; 73/49.3, 49.8, 40.7, 52; 220/256, 201, 307, DIG. 19

[56] References Cited

U.S. PATENT DOCUMENTS

| 1,208,355 | 12/1916 | Nechamkus | 220/359 X |
| 2,887,737 | 5/1959 | Prescott | 220/359 X |
| 3,289,881 | 12/1966 | Ganung | 220/307 |
| 3,867,201 | 2/1975 | Holmes | 429/185 X |
| 4,049,151 | 9/1977 | Schweiso | 220/201 |

Primary Examiner—Anthony Skapars
Attorney, Agent, or Firm—Schroeder, Siegfried, Ryan, Vidas, Steffey & Arrett

[57] ABSTRACT

An inner and outer seal arrangement for facilitating the leak testing of hermetically sealed containers.

10 Claims, 2 Drawing Figures

SEAL ARRANGEMENT FOR FACILITATING HERMETICITY LEAKAGE TESTING

BACKGROUND

Hermetically sealed containers such as encapsulated electrical devices and specialized electrochemical cells and the like are ordinarily subjected to leakage testing to evaluate the effectiveness of the hermetic seal. Generally, to leak test such a device, it is placed in a pressurized atmosphere of a test gas, such as helium, for a period of time to force the test gas into the hermetic container through the hermetic seal. No hermetic seal is perfect. Thus, some gas will always enter the container. Helium is preferred as the test gas since it has an extremely small molecule relative to most leakage opening sizes.

The test is completed by examining the hermetic container to determine if any of the helium, which entered it, is escaping. For example, one standard test for leakage is the submersion test in which the container is submerged in a heated fluorocarbon liquid, as described in Mil-STD-202E and Mil-STD-883. The formation of bubbles while submerged indicates the escape of the test gas.

In many cases such a test is gross and more refined techniques are required. Such a refined technique is provided by the use of a mass spectrometer which draws a vacuum on the hermetic container and provides an indication of the amount of test gas removed from the container.

Unfortunately, to perform these test procedures, the hermetic container is exposed between the time it is in the pressurized test gas and placement of the container in the mass spectrometer apparatus. During this exposure, even for very brief periods, a substantial amount of the test gas, particularly if it is helium, can be lost from the device, undetected. In very short times, if the volume for accepting the test gas inside the hermetic container is small, all of the test gas may be lost before the mass spectrometer can perform its test. In such an instance, the mass spectrometer indicates no test gas present and it can only be inferred that there is no leak or that the leak is so gross that all of the test gas has been lost.

It is the purpose of this invention to provide a seal arrangement which always delays the loss of test gas, thus allowing adequate time for testing the container in a mass spectrometer following exposure of the hermetic container to the pressurized test gas and which is more practical from a production standpoint.

SUMMARY OF THE INVENTION

The invention provides an inner plug sealing member for hermetically sealing the container which, although not hermetic itself, slows down leakage to a controllable rate so that it is delayed and the complete loss or any substantial loss of the test gas prior to testing in the mass spectrometer is prevented. A hermetic seal for the container per se is also provided and is spaced from the inner plug seal. The inner plug seal is an elastomeric material, preferably polytetrafluoroethylene.

DESCRIPTION OF THE PREFERRED EMBODIMENTS

Figure 2:
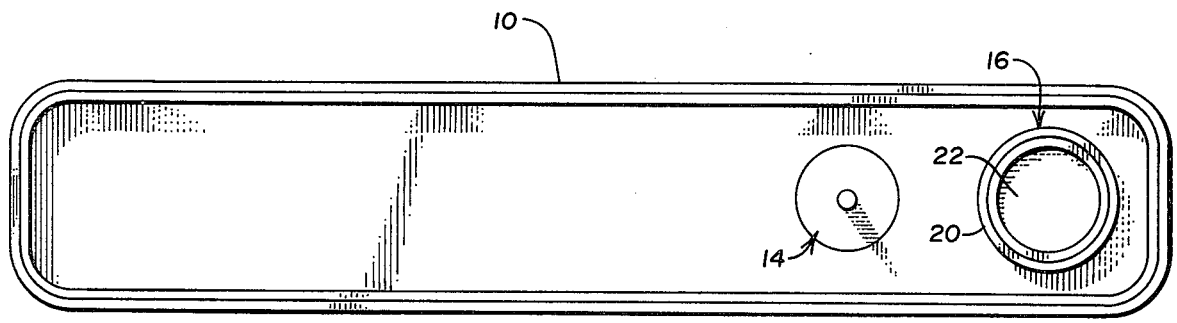
FIG. 2 is a top plan view of the battery of FIG. 1.
Figure 1:
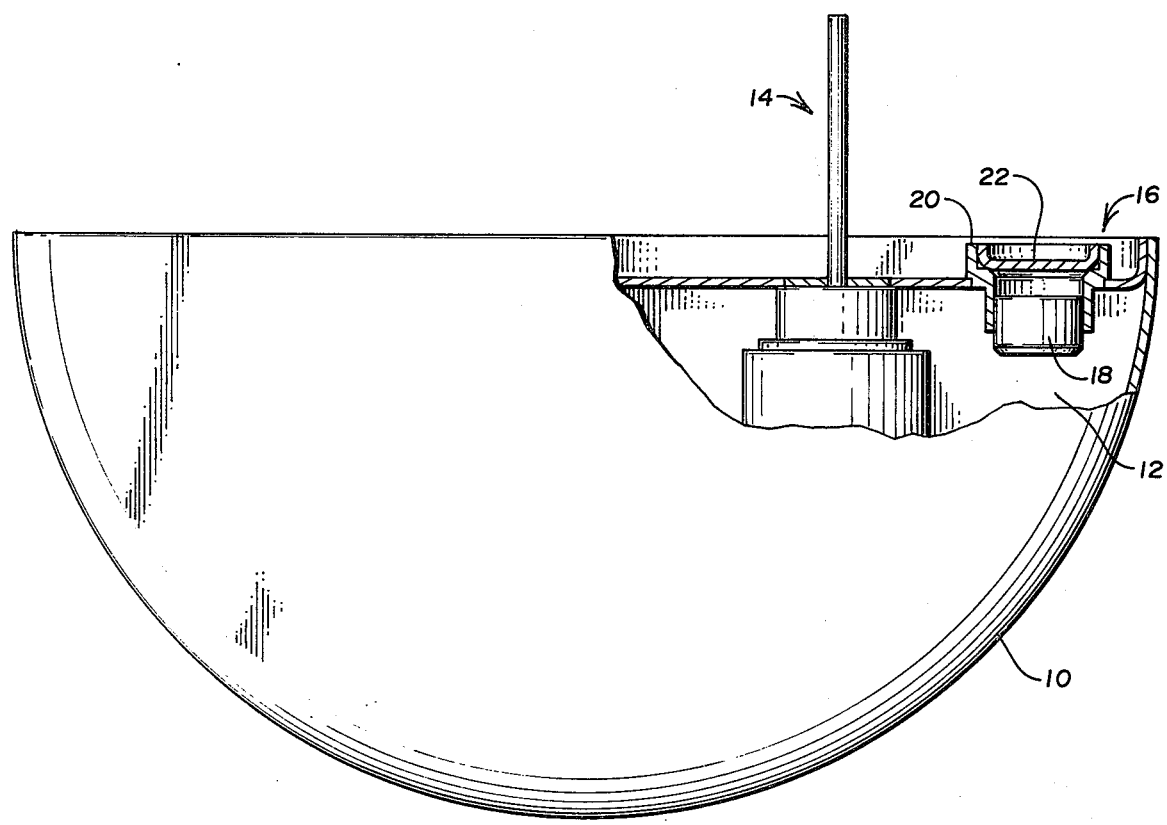
FIG. 1 is a side elevation of a hermetically sealed electrochemical battery with a portion broken away showing the seal arrangement of the invention.

The seal arrangement, according to the invention, for facilitating leakage testing was particularly designed for use in solid state batteries, particularly of the implantable type, as shown in FIGS. 1 and 2. It should be noted, however, that the invention is not limited to such hermetically sealed devices and can be extended to any hermetic containers which require leakage testing.

The particular battery shown in the figures includes a metal, preferably stainless steel, container 10 which holds, in addition to a cathode and an anode (not shown), a cathode depolarizing material such as a complex mixture of a halogen and a complexing polymer indicated at 12. A preferred depolarizer is poly-two-vinylpyridine which has been complexed with iodine to form an organic-iodine complex compound. The preferred anode is lithium and the cathode is any inert conductor such as platinum, for example. The battery includes an electrical feedthrough generally indicated at 14 which may preferably comprise a glass-metal seal by means of which the electrical leads can enter the battery without affecting the hermetic seal thereof. The battery also includes an access opening generally indicated at 16 which must be hermetically sealed and to which the invention is specifically directed.

In hermetically sealing opening 16, for the purposes of facilitating leakage testing, according to the invention, an inner plug 18, preferably composed of polytetrafluoroethylene, is press-fitted or interference-fitted into the opening. In this particular instance, the opening includes cylindrical sidewall 20 against which plug 18 may be pressed in sealing engagement. The seal formed therebetween is not hermetic. The hermetic seal is provided by outer cover member 22 which is spaced above plug 18 and welded to the wall 20 of opening 16. The hermeticity of this weld is what must be tested for leakage.

When polytetrafluoroethylene (PTFE) is used for plug member 18, it has been determined that the spacing between it and the outer member 22 is preferably on the order of about 10 mils. Such spacing provides protection of the PTFE from welding heat when outer member 22 is welded to the container opening. When other materials such as rubber or silicone are used for plug member 18, it may be necessary to provide larger spacings between the inner and outer members, such as on the order of one-half inch where possible. In batteries of the type shown in this application, such large spacings are not possible, hence the preference for PTFE as the inner seal member.

The use of PTFE also provides an additional advantage in that it tends to absorb a small percent of the helium test gas, thus acting as a getter therefor, and releasing it slowly during subsequent leakage testing.

With a seal arrangement of the type described above, it is possible to subject the hermetically sealed battery container to a pressurized helium test gas; 60 psi may be used, five atmospheres is typical; for a period of time to soak the container with helium. When the battery is transferred to the mass spectrometer, if a gross leak is present, such as on the order as $1 \times 10^{-6}$ cc/sec. to $1 \times 10^{-4}$ cc/sec., the inner plug will delay the escape of the test gas, thus allowing adequate time to place the battery within the mass spectrometer for leakage testing. Such an inner seal arrangement has been found to be effective in allowing leakage testing to be performed at any time over periods from an hour to several days. following exposure to the test gas.

The preferred interference fit, when PTFE is used, has been found to be obtained when the PTFE plug is on the order of about 5 mils larger in diameter than the opening within which it is to be interference-fitted, in the case of circular openings.

Although any elastomer material may be utilized for inner plug member 18, the fluorocarbon polymers, sometimes referred to as fluoroelastomers, are particularly preferred. Such materials are polyvinylidene fluoride, hexafluoropropylene, PFTE, fluorinated ethylene-propylene, and chlorotrifluoroethylene. Of the fluoroelastomers, as previously mentioned, PTFE is preferred. Other elastomers such as rubber, both natural or synthetic, silicone (such as the siloxane polymers), and other high-polymer materials having the property of extensibility and elastic recovery and possessing the requisite resistance to chemical reaction with the contents of the hermetic container to be tested may be used in this invention. All of the above materials are collectively termed herein "elastomers" or "elastomeric materials."

A particularly preferred PTFE material may be obtained from Chemplast, Inc., 150 Dey Road, Wayne, N.J. 07470, as pure virgin polytetrafluoroethylene rod stock which may be sized to form the polymeric plug 18.

Having described the invention by way of illustration, the exclusive property right therein is claimed as follows:

1. An inner and outer seal arrangement for facilitating the leak testing of hermetically sealed containers, comprising:
    an opening in the container for receiving the seal arrangement;
    an inner plug member of elastomeric material interference-fitted into the opening; and
    an outer hermetic seal closing the opening and spaced from the inner plug member.

2. The seal arrangement of claim 1 wherein the container is metal and the hermetic outer seal comprises a metal closure member welded to the container.

3. The seal arrangement of claim 2 wherein the plug is polytetrafluoroethylene.

4. The seal arrangement of claim 3 wherein the spacing between inner and outer member is about 10 mils.

5. The seal arrangement of claim 3 wherein the opening is circular in shape and the plug is about 5 mils larger in diameter than the opening.

6. The seal arrangement of claim 1 wherein the inner plug member is a fluoroelastomer.

7. The seal arrangement of claim 6 wherein the fluoroelastomer is polytetrafluoroethylene.

8. The arrangement of claim 1 wherein the container comprises a battery.

9. The arrangement of claim 8 wherein the battery includes a halogen component.

10. The arrangement of claim 9 wherein the halogen component is iodine.

* * * * *

UNITED STATES PATENT AND TRADEMARK OFFICE
CERTIFICATE OF CORRECTION

PATENT NO. : 4,174,424
DATED : November 13, 1979
INVENTOR(S) : Edsel O. Jurva and Howard D. Mosman It is certified that error appears in the above-identified patent and that said Letters Patent are hereby corrected as shown below:

Column 1, line 3, "ordinarly" should be --ordinarily--.

Column 3, line 15, "PFTE" should be --PTFE--.

Signed and Sealed this

*Twelfth* Day of *February 1980*

[SEAL]

*Attest:*

SIDNEY A. DIAMOND

*Attesting Officer*    *Commissioner of Patents and Trademarks*